United States Patent
Stein et al.

(10) Patent No.: US 10,198,419 B2
(45) Date of Patent: Feb. 5, 2019

(54) SYSTEMS AND METHODS FOR PROVIDING AN EMAIL CLIENT INTERFACE WITH AN INTEGRATED TABULAR DATA MANAGEMENT INTERFACE

(71) Applicant: Smartsheet.com, Inc., Bellevue, WA (US)

(72) Inventors: Daniel Stein, Redmond, WA (US); William Eric Browne, Medina, WA (US); Brent Frei, Bellevue, WA (US); Alex Vorobiev, Mercer Island, WA (US); Kyan Duane Skeem, Carnation, WA (US); Erik Rucker, Seattle, WA (US); Thomas Peter Maliska, Jr., Olympia, WA (US); Tony Jacobson, Kirkland, WA (US)

(73) Assignee: Smartsheet Inc., Bellevue, WA (US)

( * ) Notice: Subject to any disclaimer, the term of this patent is extended or adjusted under 35 U.S.C. 154(b) by 24 days.

(21) Appl. No.: 15/242,279

(22) Filed: Aug. 19, 2016

(65) Prior Publication Data

US 2016/0357724 A1 Dec. 8, 2016

Related U.S. Application Data

(63) Continuation of application No. 15/141,627, filed on Apr. 28, 2016.
(Continued)

(51) Int. Cl.
*G06F 17/24* (2006.01)
*H04L 12/58* (2006.01)
(Continued)

(52) U.S. Cl.
CPC .......... *G06F 17/243* (2013.01); *G06F 17/245* (2013.01); *G06F 17/246* (2013.01);
(Continued)

(58) Field of Classification Search
CPC ................ G06F 17/243; G06F 17/245; G06F 17/30952; G06F 17/246
See application file for complete search history.

(56) References Cited

U.S. PATENT DOCUMENTS 8,082,308 B1 * 12/2011 Filev .................. G06F 9/468
707/608
2006/0129592 A1 * 6/2006 Poozhiyil ............ G06Q 10/107
(Continued)

OTHER PUBLICATIONS

Microsoft, "The Auto-Complete list doesn't remember names or email addresses—Outlook" found in https://support.office.com/en-us/article/The-Auto-Complete-list-doesn-t-remember-names-or-email-addresses-19ba9a7d-e37a-4220-97c1-40499bc2f357, Feb. 22, 2011, Microsoft, p. 1.*

(Continued)

*Primary Examiner* — Scott T Baderman
*Assistant Examiner* — Seung Woon Jung
(74) *Attorney, Agent, or Firm* — Christensen O'Connor Johnson Kindness PLLC

(57) ABSTRACT

Systems and methods for providing an email client interface that includes an integrated supplemental interface are provided. The supplemental interface provides access to data stored within a tabular data management system. The supplemental interface may present a form that is automatically generated based on a column layout in a sheet stored in the tabular data management system. The supplemental interface may automatically select a sheet to be opened based on information in an email message, and may automatically add information from the email message to the sheet. The tabular data management system may allow image data to be stored and displayed within cells of tabular data.

15 Claims, 14 Drawing Sheets

Related U.S. Application Data

(60) Provisional application No. 62/153,813, filed on Apr. 28, 2015.

(51) Int. Cl.
*G06F 17/30* (2006.01)
*H04L 29/06* (2006.01)

(52) U.S. Cl.
CPC .......... *G06F 17/3028* (2013.01); *H04L 51/22* (2013.01); *H04L 67/42* (2013.01)

(56) References Cited

U.S. PATENT DOCUMENTS

2006/0143613 A1* 6/2006 Lippe .................. G06Q 10/06
718/100
2010/0070419 A1* 3/2010 Vadhri ................ G06Q 10/107
705/71

OTHER PUBLICATIONS

Agarwal, A., "How to Insert Images in Your Google Spreadsheet Cells," Mar. 9, 2016, Digital Inspiration, <http://www.labnol.org/internet/images-in-google-spreadsheet/18167 [retrieved Aug. 2, 2016], 1 page.

* cited by examiner

SYSTEMS AND METHODS FOR PROVIDING AN EMAIL CLIENT INTERFACE WITH AN INTEGRATED TABULAR DATA MANAGEMENT INTERFACE

CROSS-REFERENCES TO RELATED APPLICATIONS

This application is a continuation of U.S. application Ser. No. 15/141,627, filed Apr. 28, 2016, which claims the benefit of Provisional Application No. 62/153,813, filed Apr. 28, 2015, the entire disclosures of which are hereby incorporated by reference herein for all purposes.

BACKGROUND

Tabular data management systems are computer-based techniques for managing information in table formats. Such systems commonly organize information into one or more worksheets (also known as "spreadsheets" or "sheets"), with each worksheet including data in cells organized into a set of rows and a set of columns. Some tabular data management systems also provide additional interpretation of data stored in cells. One example of such a tabular data management system is Smartsheet, developed and provided by Smartsheet.com, Inc. Smartsheet is an interactive, hosted computer environment for managing and sharing information in a tabular format, including information related to projects and tasks. Within a sheet in Smartsheet, a user can edit tabular data to define, assign, schedule, edit and comment on tasks; incorporate documents and emails related to the task into the tabular data; and request updates to the tabular data that represent updates to tasks from other users. Although the term 'task' is used herein, within Smartsheet the term refers to a concept broader than a work assignment per se. A sheet may reference, edit, and provide status information upon a variety of items related to a project or user—including without limitation lists, calendar items, documents, sequences of actions (as may be displayed in a Gantt chart), email items, notes and comments, discussions, notifications, organizational structure and visualizations; dependencies between and priorities on such items; and information about uses in the system, their interactions with each other, with projects, and with documents and other communications. Smartsheet is only one example of a tabular data management system, and though its described functionality can be seen as an example of the functionality of a tabular data management system, it should not be seen as limiting.

Email is frequently used to communicate updates to be stored in tabular data, such as providing status information, updating files (via links or attachments), and scheduling information for projects represented in tabular data. However, information appears ad hoc in an email, having only the context of the email thread (such as the body text, header, subject line, date, and addressing information) to associate it with a specific project or activity. Moreover, there are inefficiencies relating to the use of separate email and project management tools such as tabular data management systems to manage projects. Editing information in an email into a spreadsheet often requires either attaching the email to a cell in a sheet row, or cutting and pasting information from the email into the sheet manually, using a separate tabular data management user interface.

Therefore, it would be desirable to create systems and methods for managing tabular data and email that permit flexible, automated transfer of context (such as defined information about a task appearing in a project sheet), content (such as email text, schedule dates, and attachments) and/or status information (such as schedule changes, completion status, and respondent name) from email messages to sheets of tabular data, adapting to any sheet's project management database schema. It would also be desirable to provide an ability to create a tabular data editing form on the fly to match an existing column structure in a tabular data sheet, its data types and formatting, and to be able to use that form to edit tabular data without leaving an email client interface and without requiring manual creation of a form to match different column structures in different sheets. It would further be desirable to provide the ability to selectively copy and move data from an email message to selected columns within a tabular data sheet within a combined email and tabular data interface. Creating new tabular data rows and/or to update existing tasks represented as rows of tabular data, with data from an email message within an email client interface would also be desirable. The ability to search for sheets and documents within a tabular data management system directly within an email client interface would also provide technical benefits.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method for concurrently managing data from an email server and a tabular data server using a combined interface is provided. An email application executing on a computing device retrieves an email message from the email server. The email application generates an email interface for presenting the email message. The email application extracts information from the email message. The email application obtains tabular data from the tabular data server using the extracted information. The email application presents the tabular data, wherein the tabular data is presented in a supplemental interface within the email interface generated by the email application.

In some embodiments, a system for combining the display of email data and tabular data from different sources into a single interface is provided. The system comprises an email server system; a tabular data management system; and an end user computing device. The end user computing device includes a non-transitory computer-readable medium having computer-executable instructions stored thereon that, in response to execution by one or more processors of the end user computing device, cause the end user computing device to present a user interface. The user interface includes a list of email messages stored by the email server system; a body of a selected email message from the list of email messages; and a form interface for retrieving and presenting tabular data relating to the selected email message.

In some embodiments, a computing device configured to store and present tabular data is provided. The computing device is further configured to provide a data store for storing tabular data. Presenting tabular data includes presenting a plurality of rows, wherein each row has a row height and a plurality of columns, wherein each column of the plurality of columns has a column width, and wherein each intersection of a row and a column is a cell; receiving a command to insert image data into a given cell; retrieving the image data based on the command; storing the image data in the data store; and presenting an image within the given cell using the image data.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3B illustrates an exemplary embodiment of a tabular data interface provided by the tabular data management system according to various aspects of the present disclosure;

FIGS. 4A-4G illustrate further aspects of using the integrated email client interface and supplemental interface to manipulate tabular data, according to various aspects of the present disclosure;

DETAILED DESCRIPTION

The technical goals and benefits described above, as well as others, may be accomplished by embodiments of the present disclosure through the integration of a supplemental interface for manipulating tabular data into an email client interface. In some embodiments of the present disclosure, rapid accumulation of information from one or more emails into a tabular data management system is provided through a simple, integrated interface.

Figure 1:
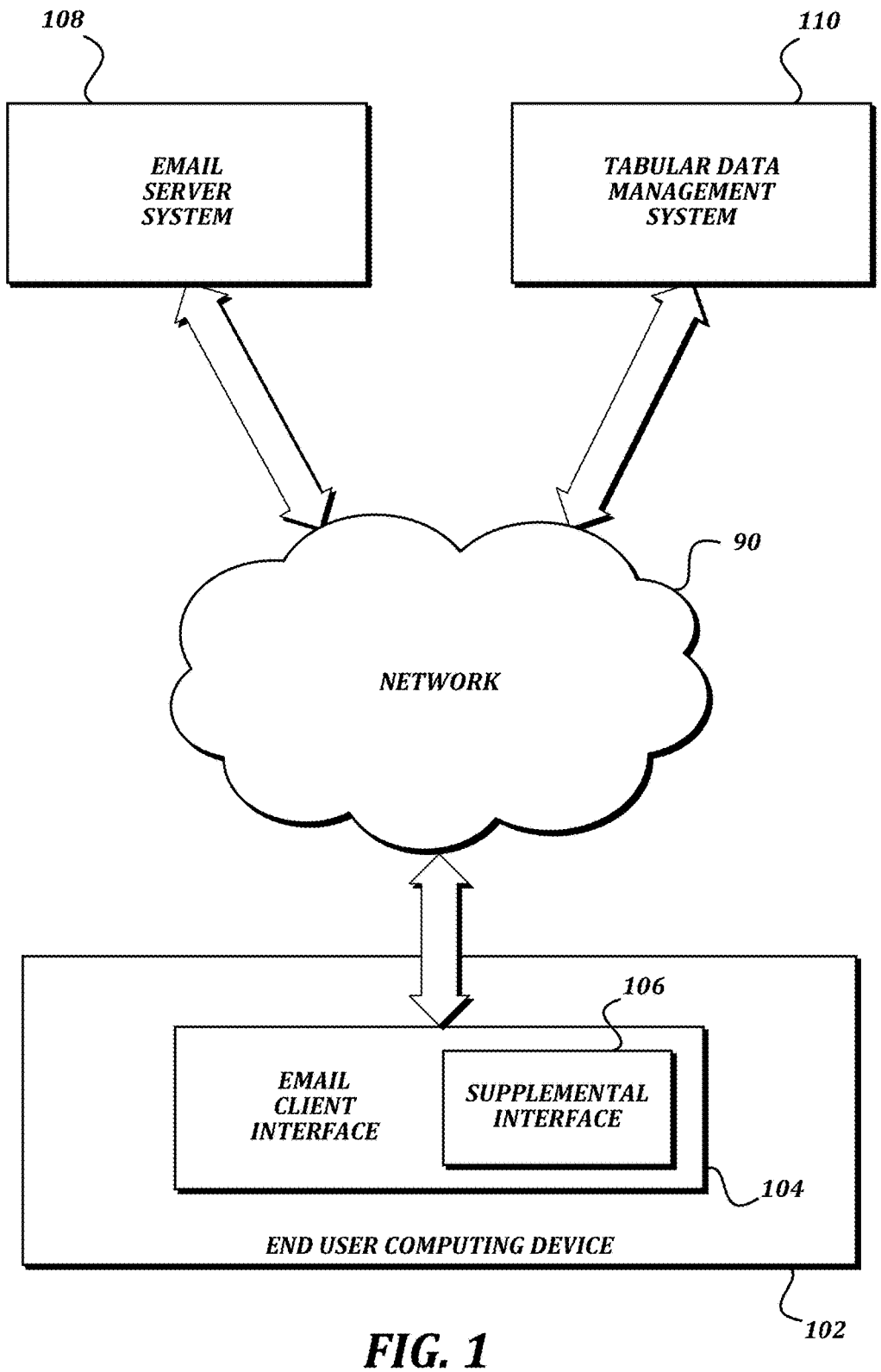
FIG. 1 is a block diagram that illustrates an exemplary embodiment of a system according to various aspects of the present disclosure.

FIG. 1 is a block diagram that illustrates an exemplary embodiment of a system according to various aspects of the present disclosure. As illustrated, the system includes an email server system 108, a tabular data management system 110, and an end user computing device 102. As shown, the tabular data management system 110 and the email server system 108 are separate from each other and from the end user computing device 102. Components of the system communicate via a network 90. The network 90 may use any suitable communication technique or combinations of techniques, including but not limited to a wide-area network (WAN); a local-area network (LAN); the Internet; a mobile telephony network such as 3G, 4G, LTE, and/or the like; a WiFi network; a Bluetooth network; and so on. In some embodiments, the email server system 108 and the tabular data management system 110 do not communicate directly with each other via the network 90, but instead the end user computing device 102 is used as an intermediary for transferring information between the email server system 108 and the tabular data management system 110. In some embodiments, the email server system 108 and the tabular data management system 110 may communicate directly to share certain functionality, such as user login or authentication.

In some embodiments, the email server system 108 may be any type of email server system. The email server system 108 may provide functionality typical of email servers, including but not limited to transmitting and receiving email messages via SMTP or other standard protocols; providing access to stored email messages and other information to stand alone client applications via protocols such as POP3, IMAP, MAPI, WebDAV, ActiveSync, LDAP, Active Directory, or any other suitable protocol; providing webmail access to email messages stored by the email server system 108, and/or any other email functionality. The email server system 108 may be implemented using one or more computing devices. Though an email server system 108 is illustrated and described herein, the basic model for the contextual integration of tabular data manipulation in a communications program is not limited to email. In some embodiments, discussion groups, blogs, unified communications or collaboration environments, RSS readers, SMS clients, social media platforms, and/or the like could be used instead of or in addition to the email server system 108.

In some embodiments, the tabular data management system 110 is also provided by one or more computing devices. The tabular data management system 110 includes a tabular data store in which information is stored in a tabular format. As understood by one of ordinary skill in the art, a "data store" as described herein may be any nontransitory computer-readable medium configured to store data for access by computing devices. Typically, a data store may include data stored in an organized manner in a volatile or nonvolatile memory. One other non-limiting example of a data store is a highly reliable, high-speed relational database management system (DBMS) executing on one or more computing devices and accessible over a network. One of ordinary skill in the art will recognize that separate data stores described herein may be combined into a single data store, and/or a single data store described herein may be separated into multiple data stores, without departing from the scope of the present disclosure.

One or more computing devices of the tabular data management system 110 provide access to the information in the tabular data store via one or more interfaces. The interfaces may include a web-based interface through which users may manipulate the tabular data via a web browser. The interfaces may also include an application programming interface (API) that provides access to the data, such that rendering of the data in a tabular format may be provided by the end user computing device 102.

In some embodiments, the end user computing device 102 is any suitable computing device for use by an end user, including but not limited to a desktop computing device, a laptop computing device, a tablet computing device, a mobile computing device such as a smartphone, a wearable computing device, and/or the like. The end user computing device 102 is configured to provide at least an email client interface 104 and a supplemental interface 106. A description of additional components common to most suitable computing devices is provided below with respect to FIG. 6.

The email client interface 104 provides functionality for retrieving and presenting email messages stored by the email server system 108, as well as for creating and sending new email messages using the email server system 108. In some embodiments, the email client interface 104 may be a stand-alone desktop application such as Microsoft Outlook, IBM Notes, Mail on OS X from Apple, Mozilla Thunderbird, and/or the like. In such embodiments, the email client interface 104 may be generated entirely by computer-executable instructions stored on and executed by the end user computing device 102. In such embodiments, the email client interface 104 communicates with the email server system 108 using one or more protocols provided by the email server system 108 as described above, including but not limited to POP3, IMAP, MAPI, ActiveSync, WebDAV, LDAP, Active Directory, SMTP, or any other suitable protocol. In other embodiments, the email client interface 104 may be a webmail interface such as Microsoft Outlook 365, Gmail, and/or the like. In such embodiments, functionality of the email client interface 104 may be split between the email server system 108 and the end user computing device 102. For example, the email client interface 104 may be generated at least partially by the email server system 108, and may be transmitted to the end user computing device 102 for rendering by a web browser.

The supplemental interface 106 provides functionality for retrieving and manipulating data within the tabular data management system 110, as discussed further below. The supplemental interface 106 may also extract information from other sources to assist in manipulating the tabular data. For example, the supplemental interface 106 may extract information from email messages, either using an API provided by the email client interface 104, or by directly accessing the email server system 108 using a standard protocol. As another example, the supplemental interface 106 may extract information from other sources, including but not limited to an address or contact list provided by the email server system 108 or stored locally by the email client interface 104.

The supplemental interface 106 is presented as an integrated part of the email client interface 104. In some embodiments, this integration may be achieved by installing an application in the email client interface 104. In some embodiments, such as an embodiment wherein the supplemental interface 106 is integrated into an installable version of Microsoft Outlook or a web-hosted version of Microsoft Outlook, the supplemental interface 106 may be embodied in an "app" that is added to Outlook from the Office Store. In some embodiments, other software architectures such as a COM-based add-in architecture, a browser plug-in, or any other suitable technique for integrating the supplemental interface 106 into the email client interface 104 may be used. In some embodiments, the email client interface 104 provides functionality to the supplemental interface 106 that allows the supplemental interface 106 to extract information related to email messages selected within the email client interface 104. In some embodiments, once the integration into the email client interface 104 takes place, an email application executing on the end user computing device 102 may be considered to be providing both the email client interface 104 and the supplemental interface 106.

Figure 2:
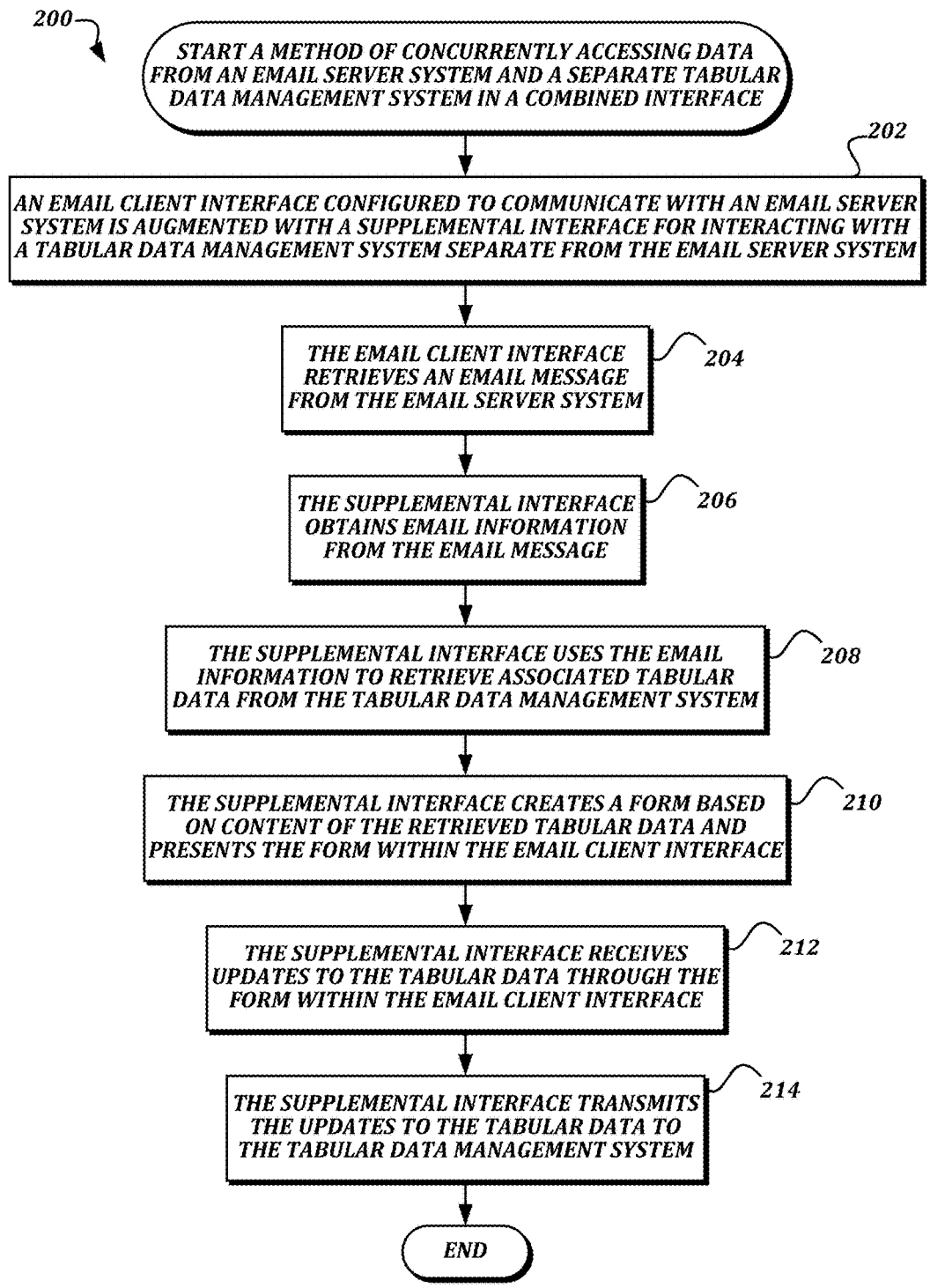
FIG. 2 is a flowchart that illustrates an exemplary embodiment of a method of concurrently accessing data from an email server system and a separate tabular data management system in a combined interface, according to various aspects of the present disclosure.

FIG. 2 is a flowchart that illustrates an exemplary embodiment of a method of concurrently accessing data from an email server system and a separate tabular data management system in a combined interface, according to various aspects of the present disclosure. From a start block, the method 200 proceeds to block 202, where an email client interface 104 configured to communicate with an email server system 108 is augmented with a supplemental interface 106 for interacting with a tabular data management system 110 separate from the email server system 108. As discussed above, this augmentation may be performed by adding the supplemental interface 106 as an "app," a COM-based add-in, a browser plugin, or using any other suitable technique.

The method 200 then proceeds to block 204, where the email client interface 104 retrieves an email message from the email server system 204. The email message may be an email message from a mailbox, such as an inbox or some other folder into which email messages are organized. In some embodiments, the email message may be retrieved and presented by the email client interface 104 after being selected from a list of email messages presented by the email client interface 104. In embodiments wherein the email client interface 104 is a webmail interface, "retrieving" may include the email server system 108 retrieving the email message from a data store, and transmitting at least some of the information from the email message to the end user computing device 102 for presentation. In some embodiments, the email message may include information such as body text, headers with addressing information such as to addresses, a from address, CC addresses, and/or the like; headers that include metadata such as a subject; one or more file attachments; one or more in-line images or other in-line data files; and/or other types of structured or unstructured information.

Next, at block 206, the supplemental interface 106 obtains email information from the email message. As discussed above, the supplemental interface 106 may use an API provided by the email client interface 104 to obtain the email information, or may obtain the email information directly from the email server system 108. The email information obtained may be any portion of the contents of the email message, or the entirety of the email message.

At block 208, the supplemental interface 106 uses the email information to retrieve associated tabular data from the tabular data management system 110. In some embodiments, a portion of the email information, such as the subject, may be used to find a matching portion of tabular data to be retrieved. For example, the subject may match a tabular data worksheet name, such that the associated worksheet is retrieved. As another example, the subject may match an entry in a column of a given worksheet, such that the row associated with the entry is retrieved. In some embodiments, a portion of the email information may directly indicate the associated tabular data using a sheet name and row/column combination, a unique identifier of a portion of tabular data, and/or any other suitable technique.

In some embodiments, the supplemental interface 106 may extract the information from the email message and use it for something other than indicating associated tabular data to be retrieved. For example, the supplemental interface 106 may use the extracted information to automatically modify tabular data that was retrieved via the supplemental interface 106 in some other way. As some non-limiting examples of other ways the tabular data may be retrieved if the information extracted from the email message is not used to do so, in some embodiments, the retrieval of tabular data may be performed using a Search function provided by the supplemental interface 106 to list available sheets by name, topic, user, organization, project, and so on, and selecting the sheet to retrieve from the list. In some embodiments, a sheet may be selected from a list of Favorite Sheets, Recently Opened Sheets, or All Sheets to which the user has access. In some embodiments, a sheet may be retrieved by the supplemental interface 106 because it is presently open on the end user computing device 102 in another application, or by the user on a different computing device. The supplemental interface 106 may determine which sheets are opened in other applications or on other devices by requesting such information from the tabular data management system 110. In some embodiments, a completely new sheet could be created on the fly to be presented by the supplemental interface 106. Within the selected sheet, the appropriate row for update may be selected by browsing or searching the rows in the selected sheet using the supplemental interface 106. Alternately, a new row could be added to the selected sheet using the supplemental interface 106.

At block 210, the supplemental interface 106 creates a form based on content of the retrieved tabular data and presents the form within the email client interface 104. In some embodiments, sheets of tabular data stored by the tabular data management system 110 may include sheets with different combinations of columns. Accordingly, a custom form may be automatically created by the supplemental interface 106, with prompts or labels matching a name of each column, and entry fields for accepting entries matching a data type of each column. In some embodiments, all columns of the sheet will be included in the generated form. In some embodiments, less than all of the columns of the sheet will be included, either by a user configuration made within the tabular data management system 110, or automatically based on information within the email message. Such automatic form creation allows for the presentation of forms for differently configured sheets without requiring configuration by a user. As illustrated below, presenting the form within the email client interface 104 may refer to displaying the form within the supplemental interface 106, which is itself presented as part of the email client interface 104.

Typically, the generated form may represent column titles or names in labels next to row fields to be filled in. Alternatively, the generated form might present the titles in labels above the fields. Once the form is generated, the supplemental interface 106 may automatically fill in at least some of the fields of the form using the email information (such as automatically copying attachments, email addressing, subject headers and/or body text directly into appropriate form fields, or by copying other data from the email message to the form where the supplemental interface 106 can find a correspondence between identifiers in the sheet and the email information. In some embodiments, the supplemental interface 106 may search the email information for suitable form content based on information associated with the columns. For example, if a column is associated with a "currency" data type, the supplemental interface 106 may search the email information for a dollar sign (or other symbol representing a currency) next to a number, and may use such a number as an automatic entry for the column. As another example, if a column is associated with a "date" data type, the supplemental interface 106 may search the email information for a date string using a pattern matcher or other suitable technique, and may use a date that is found as an automatic entry for the column.

Next, at block 212, the supplemental interface 106 receives updates to the tabular data through the form within the email client interface 104. Again, receiving the updates through the form within the email client interface 104 may refer to displaying the form within the supplemental interface 106, which is itself presented as part of the email client interface 104. The updates to the tabular data may include, but are not limited to, edits to an existing data row; adding a new data row; deleting existing data rows; attaching one or more files to data row; adding one or more image files or image data to be displayed within a cell as described below; and/or any other types of updates.

In some embodiments, edits may be received through interface elements configured for receiving data of a type of each column. For example, a column of a text data type may use a text input interface element, a column of a date data type may use a calendar picker interface element, a column of a type with a limited set of options may use a drop-down list interface element, and/or the like. In some embodiments, an interface element may pull data from the email message or from the email server system 108 to aid in data entry. For example, a column configured to store contact information may use an interface element that queries the email server system 108 or the email message headers for contacts to be selected.

At block 214, the supplemental interface 106 transmits the updates to the tabular data to the tabular data management system 110. The supplemental interface 106 may use any suitable technique for transmitting the updates, including but not limited to submitting the updates to an API provided by the tabular data management system 110, submitting the updates to a web service provided by the tabular data management system 110, and/or the like. After the updates have been transmitted, the sheet may still be displayed within the supplemental interface 106, so that another row may be added to the tabular data. The supplemental interface 106 may also allow the user to go back to the search results and choose a different sheet or row to edit based on the same search term or an updated search term.

In some embodiments, data may also be stored regarding the association of one or more specific sheets with the email message for later purposes. In some embodiments, the email message may be transmitted to the tabular data management system 110 in its entirety to be attached or linked to a portion of tabular data. In some embodiments, the supplemental interface 106 may maintain records or metadata associating one or more edited sheets associated with the email message. In this way, the edited sheets may be automatically presented by the supplemental interface 106 the next time the email message is opened by the email client interface 104. In some embodiments, such records or metadata may be added by the supplemental interface 106 to the email message itself.

The method 200 then proceeds to an end block and terminates.

Figure 3A:
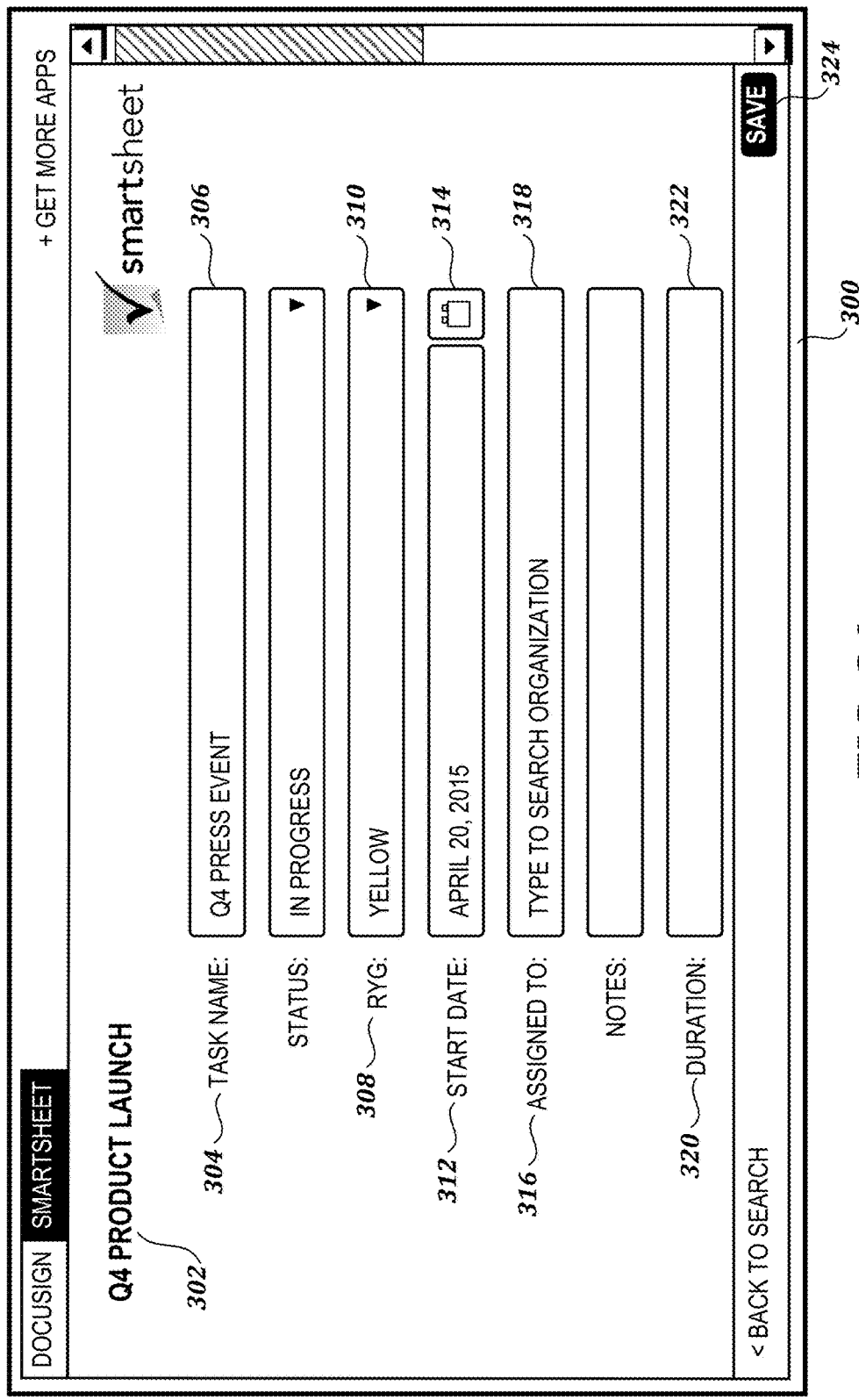
FIG. 3A illustrates an exemplary embodiment of a supplemental interface according to various aspects of the present disclosure.

FIG. 3A illustrates an exemplary embodiment of a supplemental interface according to various aspects of the present disclosure. The illustrated supplemental interface 300 would normally be presented within an email client interface 104, but is illustrated separately in FIG. 3A for the sake of clarity. The supplemental interface 300 is illustrated as displaying a generated form. The form includes a sheet title 302 and a set of interface elements for modifying a row in the tabular data sheet. Each interface element is configured to accept input according to a data type of the associated column, and is associated with a label that provides the column name. A first label 304 for the "task name" column is associated with a text entry interface element 306 which accepts entry of text. A second label 308 for the "RYG" column is associated with a drop down interface element 310 that provides the ability to select from a set of possible cell value options. The drop down interface element 310 may obtain the options from the tabular data management system 110 as part of the definition of the associated column. A third label 312 for the "start date" column is associated with a calendar picker interface element 314 that, when selected, presents a calendar that allows a date to be chosen. The calendar picker interface element 314 may also allow direct entry of a date.

A fourth label 316 for the "assigned to" column is associated with a contact finder interface element 318. The contact finder interface element 318 may communicate with the email client interface 104 and/or the email server system 108 in order to obtain a list of contacts from which the user may select a contact. A fifth label 320 for the "duration" column is also associated with a text entry interface element 322. Once changes are made to the form, a save button interface element 324 may be used to transmit the changes to the tabular data management system 110. If the user chose to add a new row, then most of the interface elements may start out empty or blank, and the user can enter values (or the supplemental interface 106 may pre-populate values based on information extracted from the email message). If the user chose to edit an existing row (as shown in FIG. 3A), the values are prepopulated with data from the sheet, and the user can edit any desired fields.

Figure 3B:
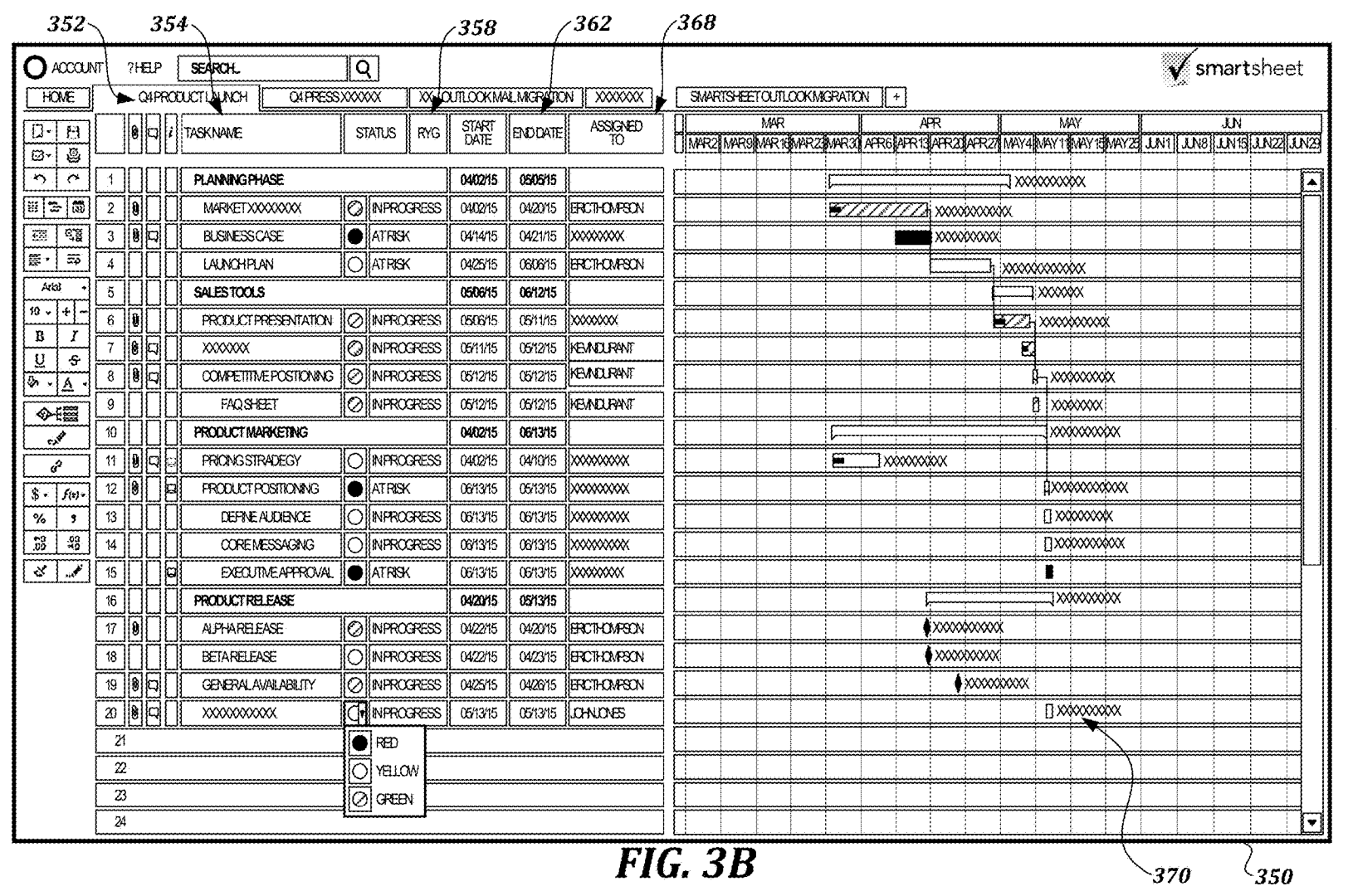

The labels and interface elements of the form in the supplemental interface 300 match the configuration of columns of an associated sheet. FIG. 3B illustrates an exemplary embodiment of a tabular data interface provided by the tabular data management system according to various aspects of the present disclosure. The tabular data interface 350 shows a sheet on which the form in the supplemental interface 300 illustrated in FIG. 3A is based. The sheet title 352 matches the sheet title 302 displayed in the form. The task name column 354 stores text data, the RYG column 358 stores a selection from a set of possible values (red, yellow, green) associated with visual indicators, the start date column 362 stores a date value, and the assigned to column 368 stores a contact. A duration column may be hidden, and the duration value used in combination with a value stored in the start date column 362 to provide a Gantt-like view of a task duration 370. Each of these columns is used as the basis for automatically presenting one of the form input interface elements illustrated in FIG. 3A.

Figure 4A:
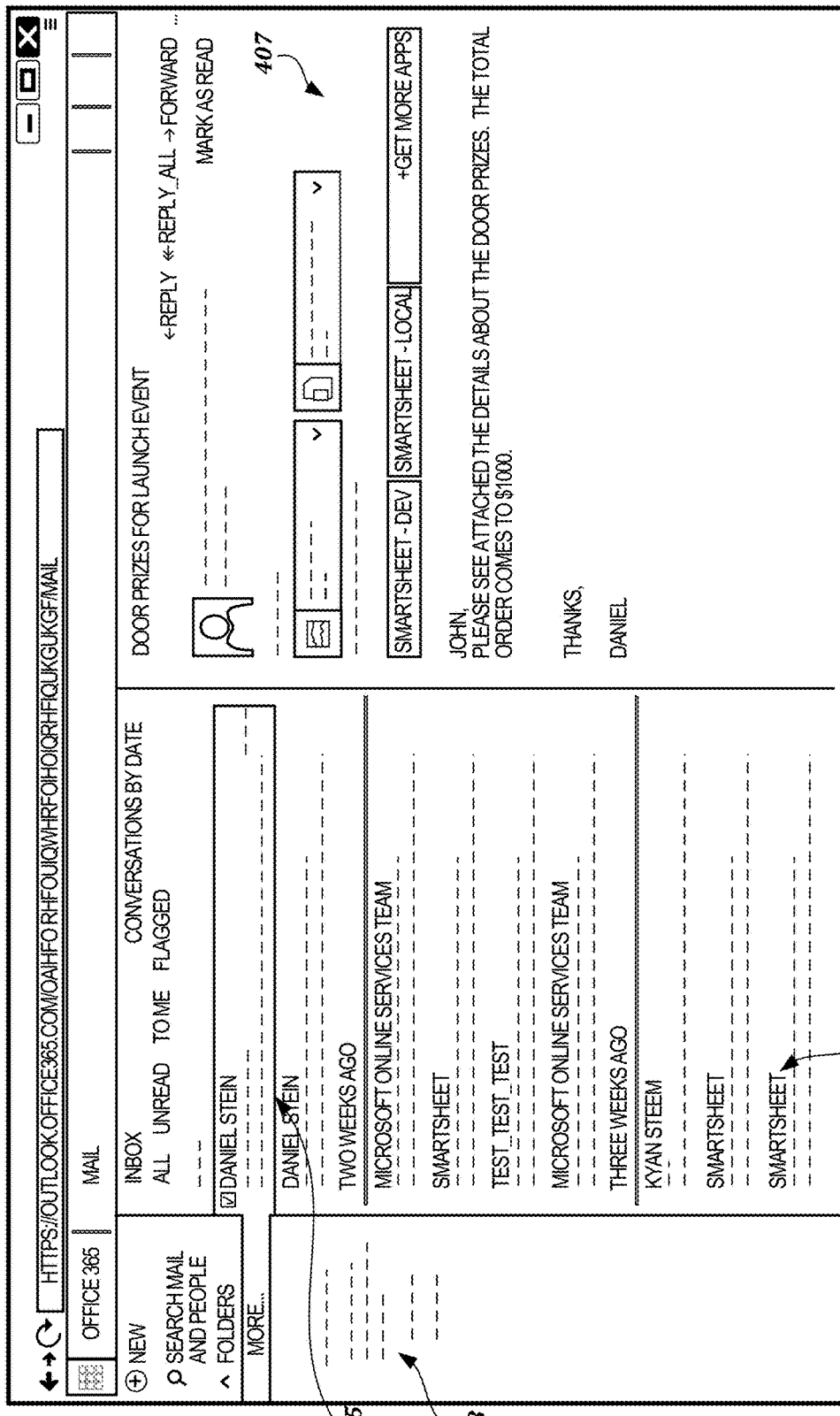

FIGS. 4A-4G illustrate further aspects of using the integrated email client interface 104 and supplemental interface 106 to manipulate tabular data, according to various aspects of the present disclosure. FIG. 4A illustrates an exemplary embodiment of an email client interface according to various aspects of the present disclosure. The email client interface 400 presents a list of folders 403 and a list of email messages 401. Content of a selected email message 405, including but not limited to a subject, attachments, body text, and a sender's contact information, is displayed in an email reading pane 407. Of course, the email message may relate to any topic, but as illustrated, the email message includes a vendor proposal and images of items to be included in the proposal.

Figure 4B:
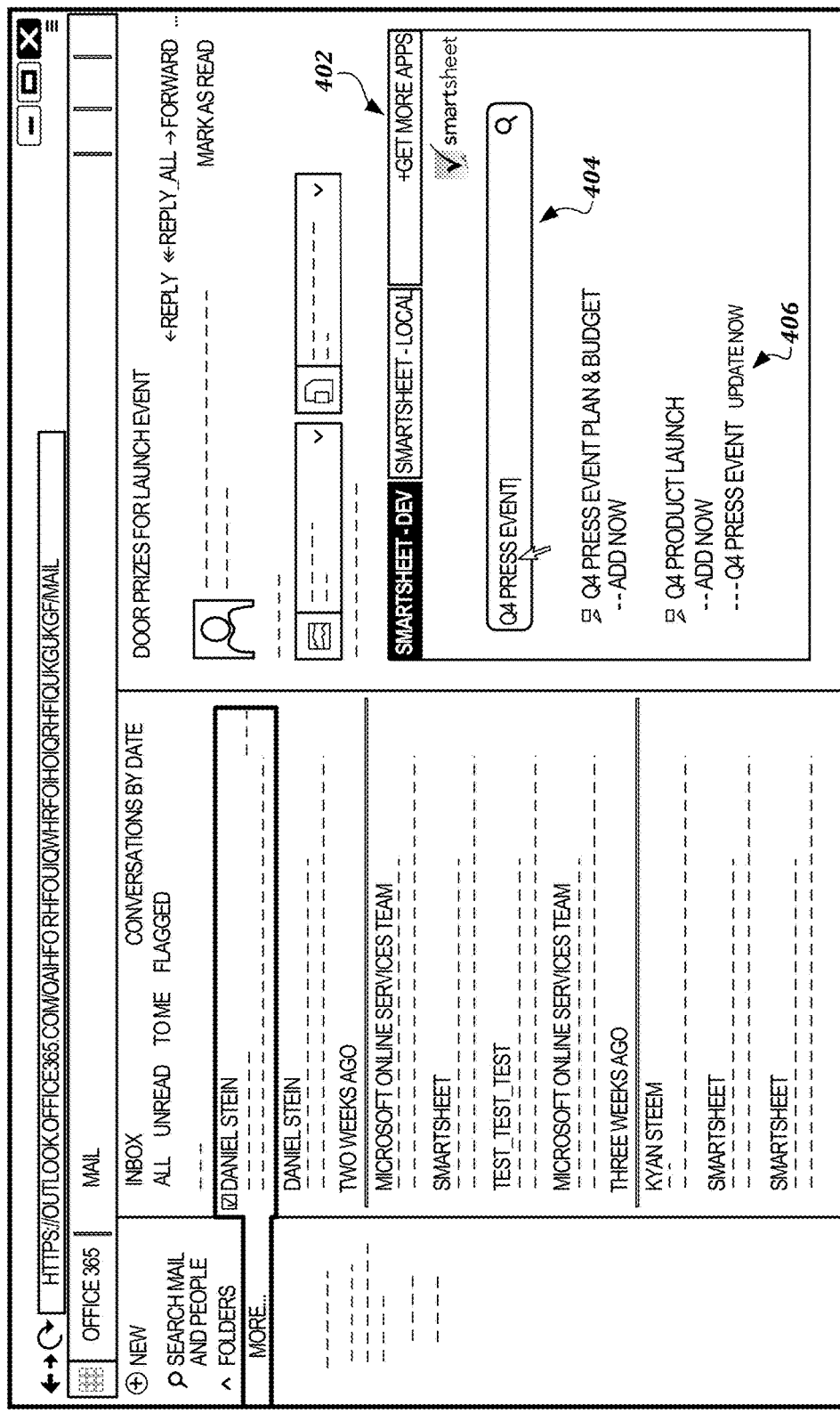

FIG. 4B illustrates an exemplary embodiment of the email client interface as updated with the supplemental interface according to various aspects of the present disclosure. Using the supplemental interface 402 within the email client interface 400 while having the email open, a search interface element 404 is presented to allow the user to search for a relevant sheet in the tabular data management system 110. A sheet may be selected from a result list 406, along with an option to either add a new row or to update an existing row.

Figure 4C:
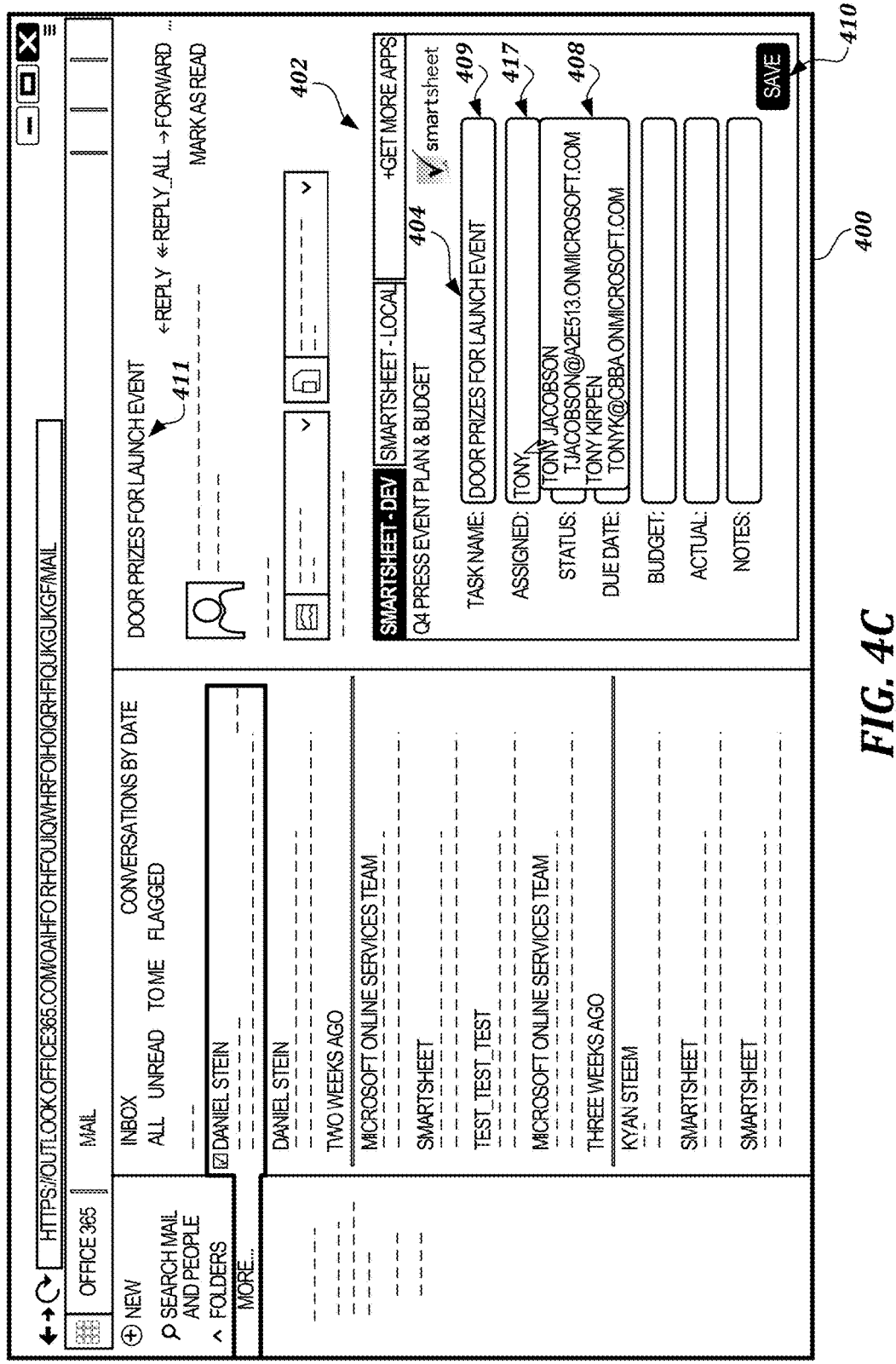

FIG. 4C illustrates an exemplary embodiment of a form interface generated by the supplemental interface according to various aspects of the present disclosure. In FIG. 4C, the "add row" option had been selected, and a form 404 that matches columns from the selected sheet is automatically generated by the supplemental interface 402. As shown, some of the form elements have been pre-populated by the supplemental interface 402 by using information extracted from the email message. For example, a task name interface element 409 is pre-populated with the subject 411 extracted from the email message. An assigned interface element 417 accepts a typed entry from a user, and uses the typed entry to query the email server system 108 for a list of contacts that match the typed entry to provide functionality such as auto-complete. As shown, a list of contacts 408 is presented below the assigned interface element 417 to allow a selection of a contact. In some embodiments, the assigned interface element 417 may also retrieve contact information to display in the list of contacts 408 from other sources, including but not limited to the tabular data management system 110 and the email message itself. Once the desired changes are entered, they may be transmitted to the tabular data management system 110 by actuating the save button interface element 410.

Figure 4D:
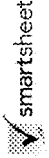
Figure 4E:
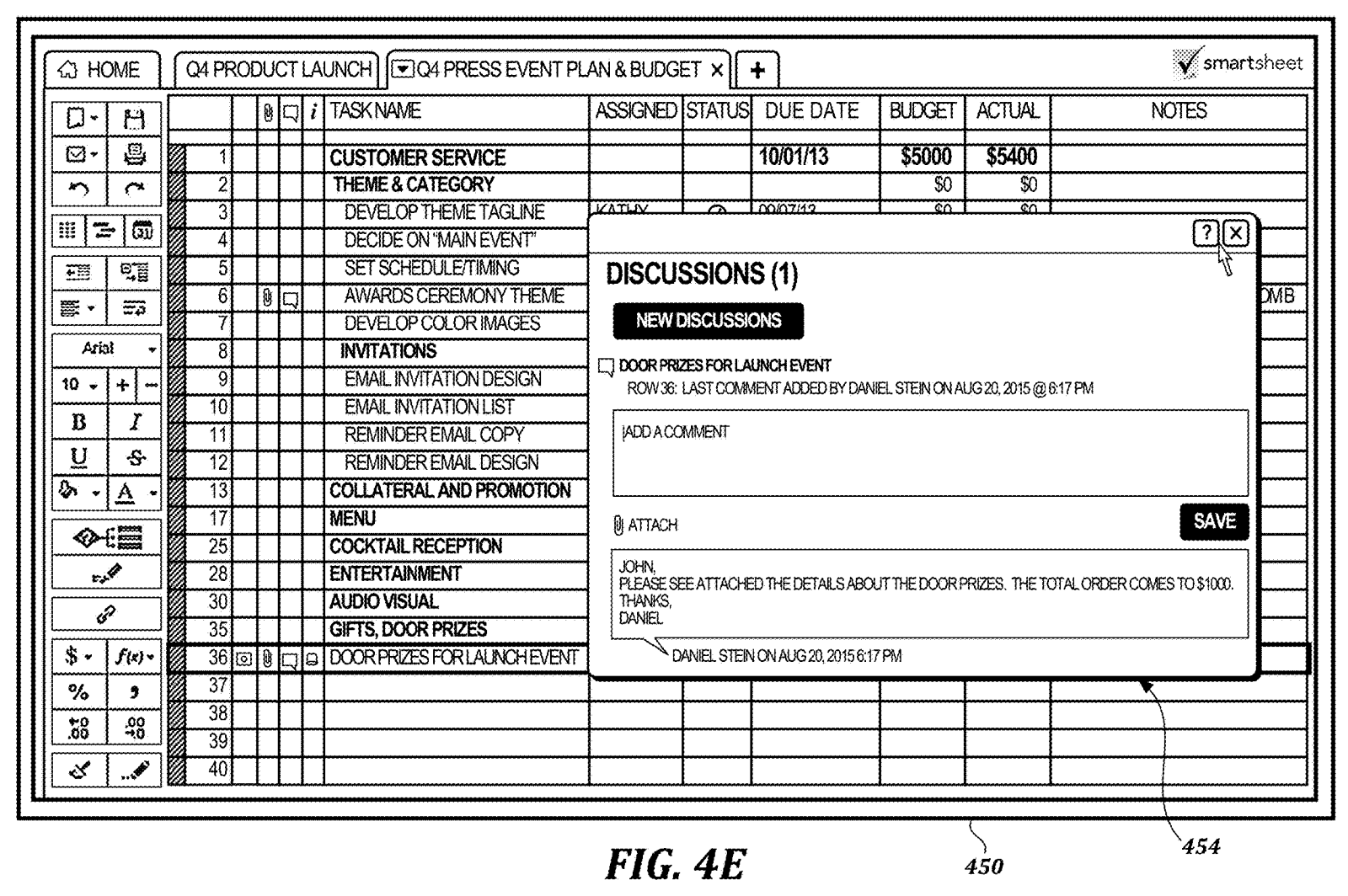

FIGS. 4D and 4E illustrate an exemplary embodiment of a tabular data interface that has been updated using the supplemental interface according to various aspects of the present disclosure. As shown in the tabular data interface 450 of FIG. 4D, a new row 452 has been added to the sheet to reflect the entries made in the form 404. FIG. 4E illustrates a tabular data interface 450 that shows a discussion 454 related to the new row and stored within the tabular data management system 110. In the discussion 454, information extracted from the email message, such as the email body text and the sender contact information, was automatically added to the discussion 454 upon creation of the row using the form 404.

Figure 4F:
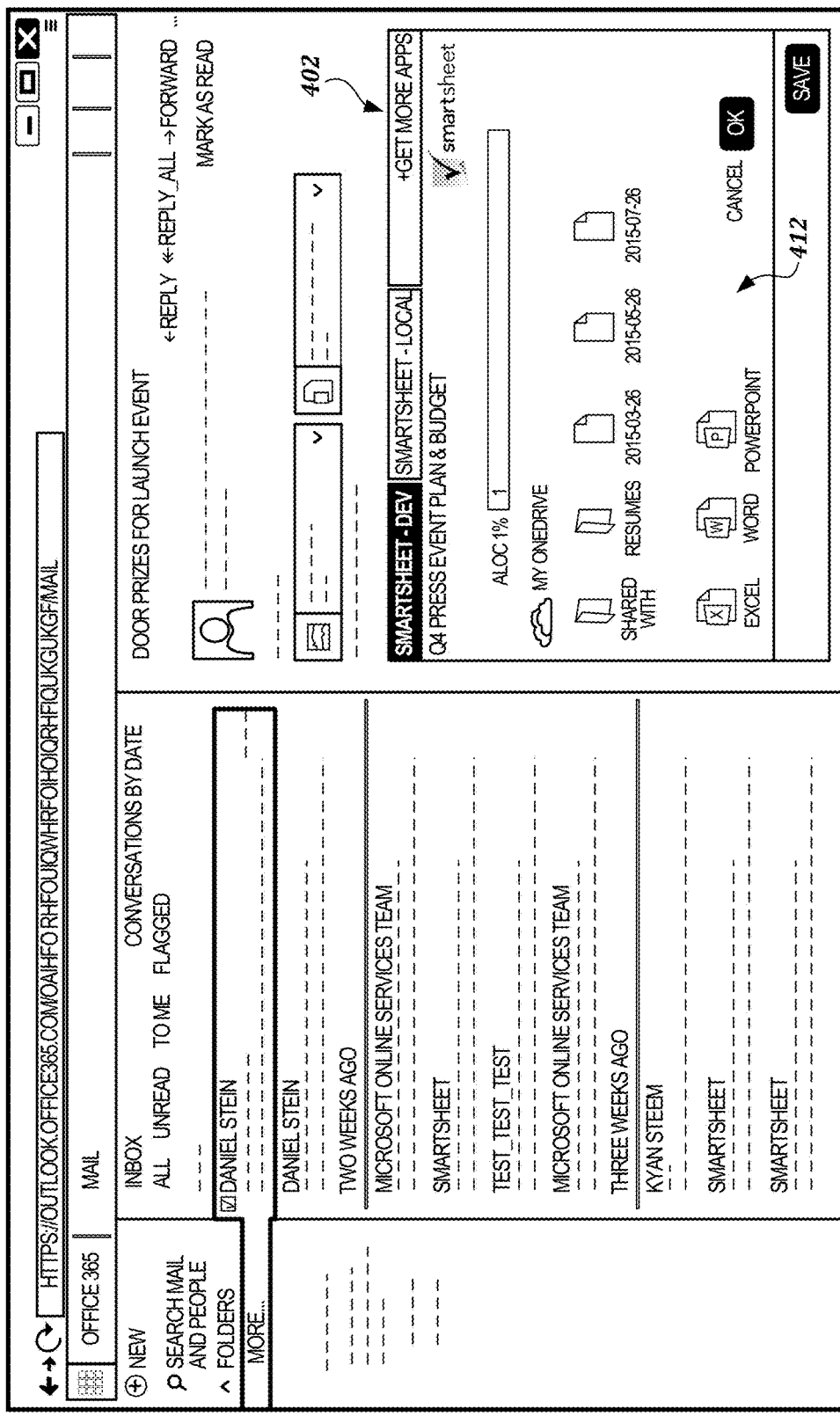
Figure 4G:
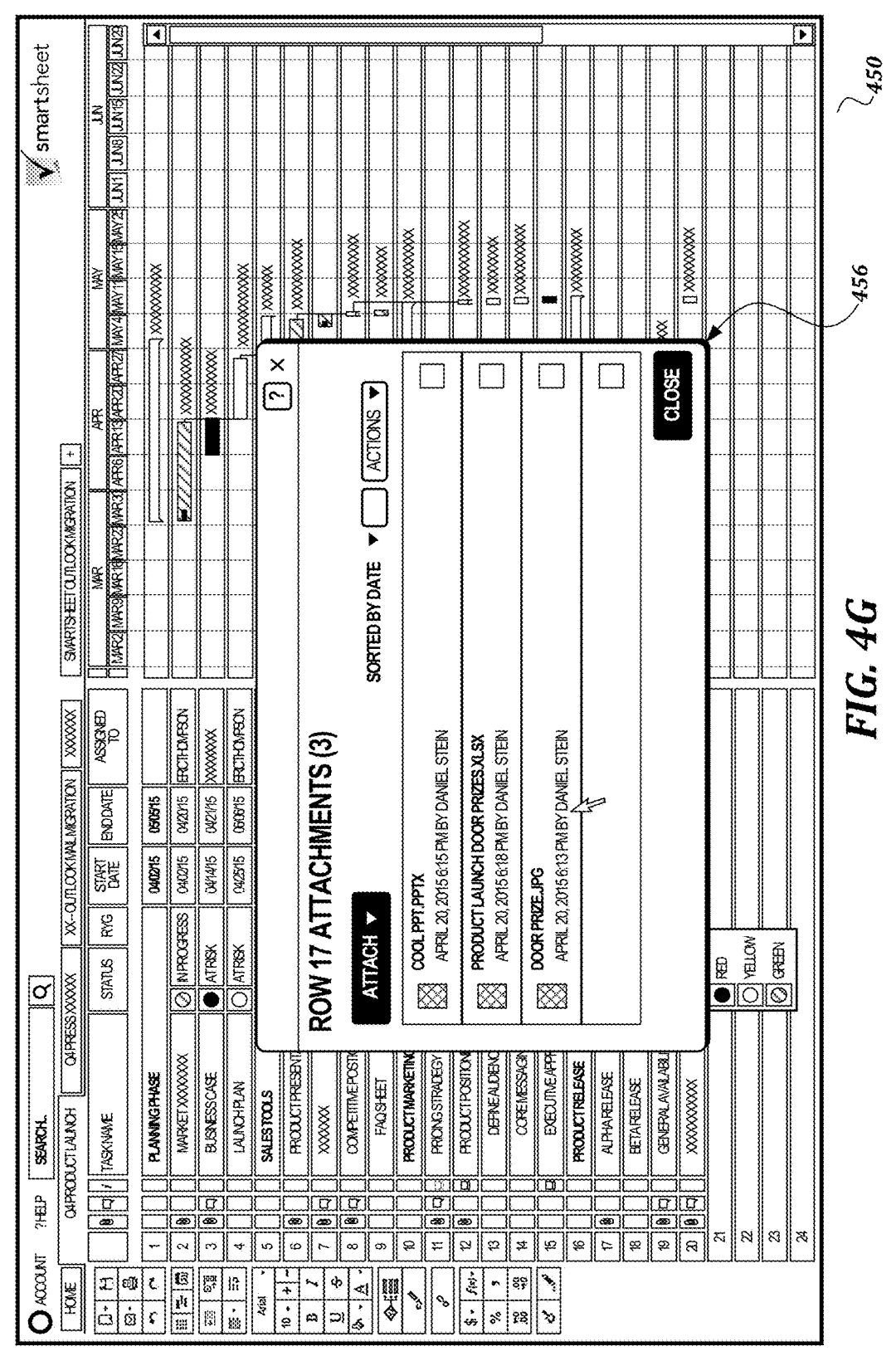

FIG. 4F illustrates an exemplary embodiment of the email client interface as updated with a supplemental interface that provides the ability to attach files to a tabular data element according to various aspects of the present disclosure. In the email client interface 400, the supplemental interface 106 is illustrated as displaying a file dialog 412. The file dialog 412 allows the user to select a file to be associated in the tabular data management system 110 with the row being added or edited within the supplemental interface 402. The file dialog 412 may allow files to be selected from any source, such as a local storage medium, a cloud storage service, or the attachments to the email message. FIG. 4G illustrates an exemplary embodiment of a tabular data interface 450 that shows files attached to a tabular data element using the supplemental interface 402. An attachment dialog 456 shows the files that have been extracted from the email message by the supplemental interface 402 or selected using the file dialog 412 and transmitted to the tabular data management system 110 to be attached to the selected row.

Figure 5A:
FIG. 5A illustrates an exemplary embodiment of a tabular data interface which includes images within tabular data cells according to various aspects of the present disclosure.

FIG. 5A illustrates an exemplary embodiment of a tabular data interface which includes images within tabular data cells according to various aspects of the present disclosure. Some existing tabular data management systems allow for the addition of images to a sheet. However, the functionality of most existing systems merely allow the image to be placed on top of the sheet in a "floating" manner, as opposed to being presented within a given cell of the tabular data. In systems that provide "floating" image functionality, the position of the image on the display screen remains the same, even if the underlying tabular data is rearranged (such as by adding, removing, resizing, reordering, filtering, or hiding one or more rows or columns). In FIG. 5A, the tabular data interface 500 includes a column 502 having cells that include image data. The image in each cell remains within the given cell as does cell content in other rows, even if a column is added to the left of the column 502 (thus moving the column 502 to the right) or a row is added above a given image cell (thus moving the row down). The image in each cell may also be scaled appropriately when resizing the associated row or column. The image also remains in the cell when using other common functionality, such as reordering columns, filtering or sorting rows, hiding or showing rows or columns, hyperlinks, and/or the like. The image data in each cell is stored within the tabular data management system 110, such that privacy may be maintained and a public image source is not needed.

Figure 5B:
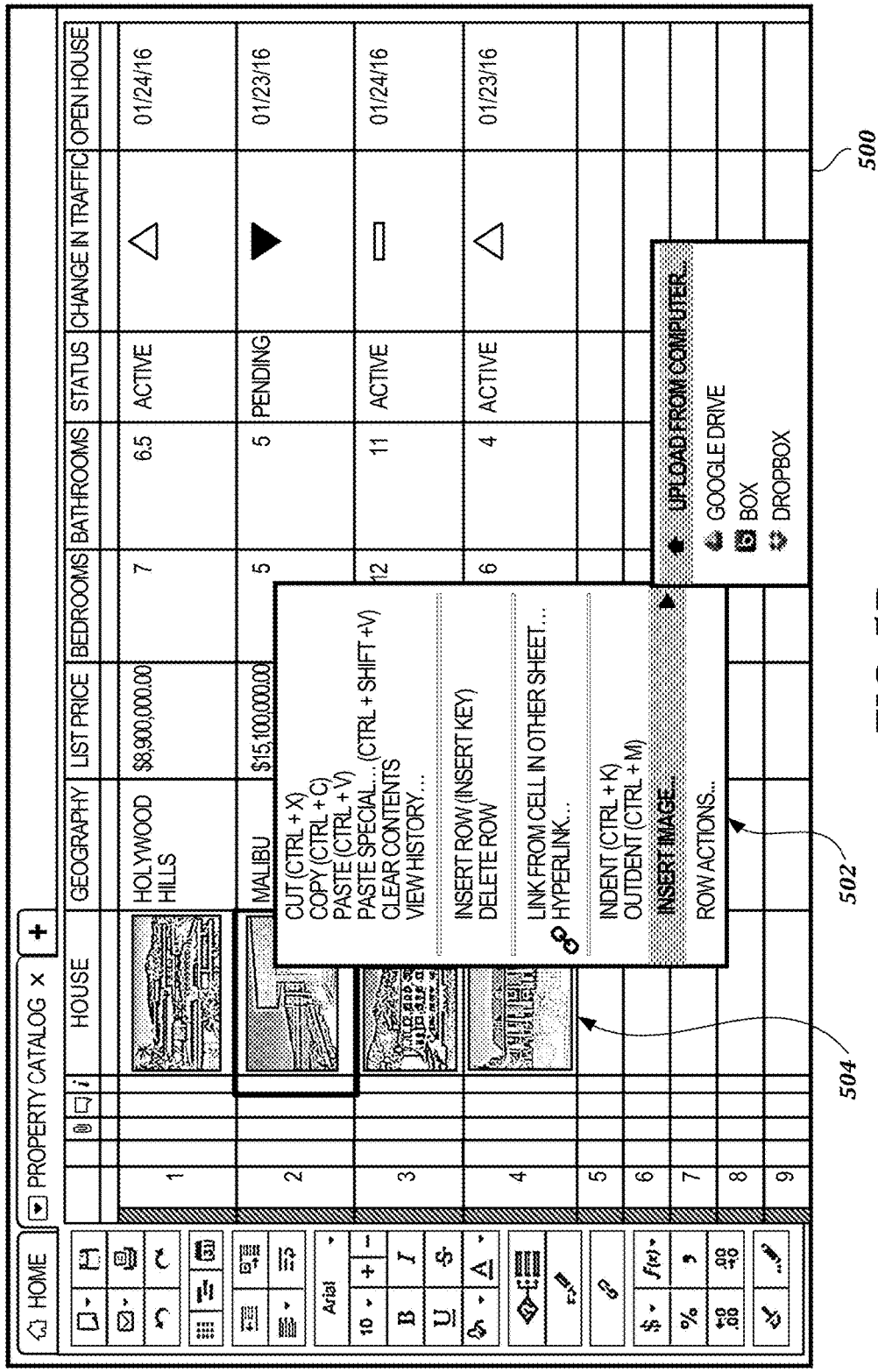
FIG. 5B illustrates another exemplary embodiment of a tabular data interface which includes images within tabular data cells according to various aspects of the present disclosure.

FIG. 5B illustrates another exemplary embodiment of a tabular data interface which includes images within tabular data cells according to various aspects of the present disclosure. This tabular data interface 500 shows a set of right click menu options 506 for adding an image to a tabular data cell 504. As shown, the tabular data interface 500 allows upload of a file from the end user computing device 102, or transfer of a file from a cloud storage system. In some embodiments, image data may be added to a tabular data cell 504 by the supplemental interface 106 by extracting in-line images from an email message, or by extracting image file attachments from an email message. In some embodiments, the image presented in the tabular data interface 500 may be a thumbnail sized to fit the cell, and clicking on the thumbnail would allow viewing of the full-sized image.

Figure 6:
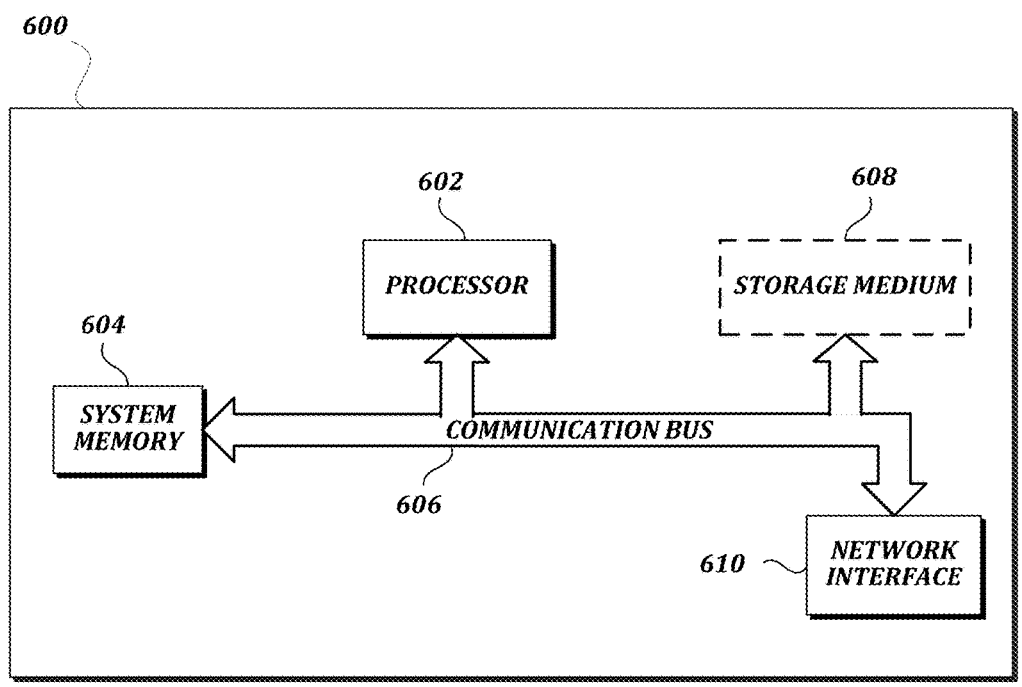
FIG. 6 is a block diagram that illustrates aspects of an exemplary computing device appropriate for use with embodiments of the present disclosure.

FIG. 6 is a block diagram that illustrates aspects of an exemplary computing device 600 appropriate for use with embodiments of the present disclosure. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606.

Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, LTE, WiMAX, Bluetooth, and/or the like.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 604 and storage medium 608 depicted in FIG. 6 are merely examples of computer-readable media.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 600 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method for concurrently managing data from an email server and a tabular data server using a combined interface, the method comprising:
   retrieving, by an email application executing on a computing device, an email message from the email server;
   generating, by the email application, an email interface for presenting the email message;
   extracting, by the email application, information from the email message;
   obtaining, by a supplemental interface added to the email application, tabular data from the tabular data server using the extracted information;
   determining, by the supplemental interface, a set of columns present in the obtained tabular data;
   generating, by the supplemental interface, a form interface that includes a field for each column in the set of columns;
   presenting, by the supplemental interface, the generated form interface;
   determining, by the supplemental interface, a data type of a column of the set of columns, wherein the data type is a currency data type;
   detecting, by the supplemental interface, a value having the data type within the extracted information;
   automatically inserting, by the supplemental interface, the value within a field of the form interface associated with the column; and
   transmitting, by the supplemental interface, the value to the tabular data server to be saved;

wherein the email server and the tabular data server are separate from each other and the computing device.

2. The method of claim 1, wherein the information extracted from the email message includes a subject of the email message, and wherein obtaining tabular data from the tabular data server includes retrieving a tabular data row that matches the subject of the email message.

3. The method of claim 1, further comprising:
displaying the form interface with blank values or default values within one or more fields of the form interface;
receiving at least one input value in the one or more fields of the form interface; and
transmitting the at least one input value to the tabular data server for the creation of a new row of tabular data that includes the at least one input value.

4. The method of claim 1, further comprising:
receiving an input that indicates image data to be added to a tabular data cell; and
transmitting the image data to the tabular data server for storage and display within the tabular data cell.

5. The method of claim 1, further comprising:
receiving an input that indicates a data file to be associated with a tabular data row; and
transmitting the data file to the tabular data server for storage in association with the tabular data row.

6. The method of claim 1, further comprising:
transmitting body text of the email message to the tabular data server to be stored in association with a tabular data row presented in the generated form interface.

7. The method of claim 1, wherein the retrieved data includes contact information.

8. The method of claim 1, wherein using at least some of the obtained tabular data to provide selectable options for entry of data values into the form interface includes presenting a list of selectable options to auto-complete a partial entry in the form interface.

9. The method of claim 1, further comprising:
automatically retrieving an inline image or an image attachment from the email message; and
transmitting the inline image or the image attachment to the tabular data server to be stored in a tabular data cell or in association with a tabular data row.

10. The method of claim 1, wherein the email message is retrieved via a POP connection, an IMAP connection, a MAPI connection, an ActiveSync connection, a WebDAV connection, a web service connection, or an HTTP connection to a web interface.

11. The method of claim 1, further comprising receiving, by the supplemental interface, the information extracted from the email message via an application programming interface (API) provided by the email application.

12. A system for combining the display of email data and tabular data from different sources into a single interface, the system comprising:
an email server system;
a tabular data management system separate from the email server system; and
an end user computing device that includes a non-transitory computer-readable medium having computer-executable instructions stored thereon that, in response to execution by one or more processors of the end user computing device, cause the end user computing device to execute an email application;
wherein the email application provides a user interface that includes:
a list of email messages stored by the email server system; and
a body of a selected email message from the list of email messages;
wherein a supplemental interface is installed in the email application;
wherein the supplemental interface provides a form interface for retrieving and presenting tabular data relating to the selected email message from the tabular data management system; and
wherein the supplemental interface is configured to:
obtain tabular data from the tabular data management system;
determine a set of columns present in the obtained tabular data;
generate a form interface that includes a field for each column in the set of columns;
present the generated form interface;
determine a data type of a column of the tabular data, wherein the data type is a currency data type;
detect a value having the data type within the selected email message by detecting a number within the email message next to a symbol representing the currency data type;
automatically insert the value within a field of the form interface associated with the column; and
transmit the value to the tabular data management system to be saved.

13. The system of claim 12, wherein obtaining tabular data from the tabular data management system includes:
extracting a subject from a selected email message using an application programming interface (API) provided by the email application; and
retrieving a tabular data row from the tabular data management system that matches the subject of the email message.

14. The system of claim 12, wherein the supplemental interface is further configured to:
present a retrieval interface for searching tabular data content or browsing tabular data content; and
retrieve a tabular data row from the tabular data management system based on a selection received by the retrieval interface.

15. The system of claim 12, wherein the email application is configured to:
retrieve data from the email server system; and
provide the data to the supplemental interface via an application programming interface (API) of the email application; and
wherein the supplemental interface is further configured to use the data from the email application to provide selectable options within the form interface for entry of data values into the form interface.

* * * * *